…

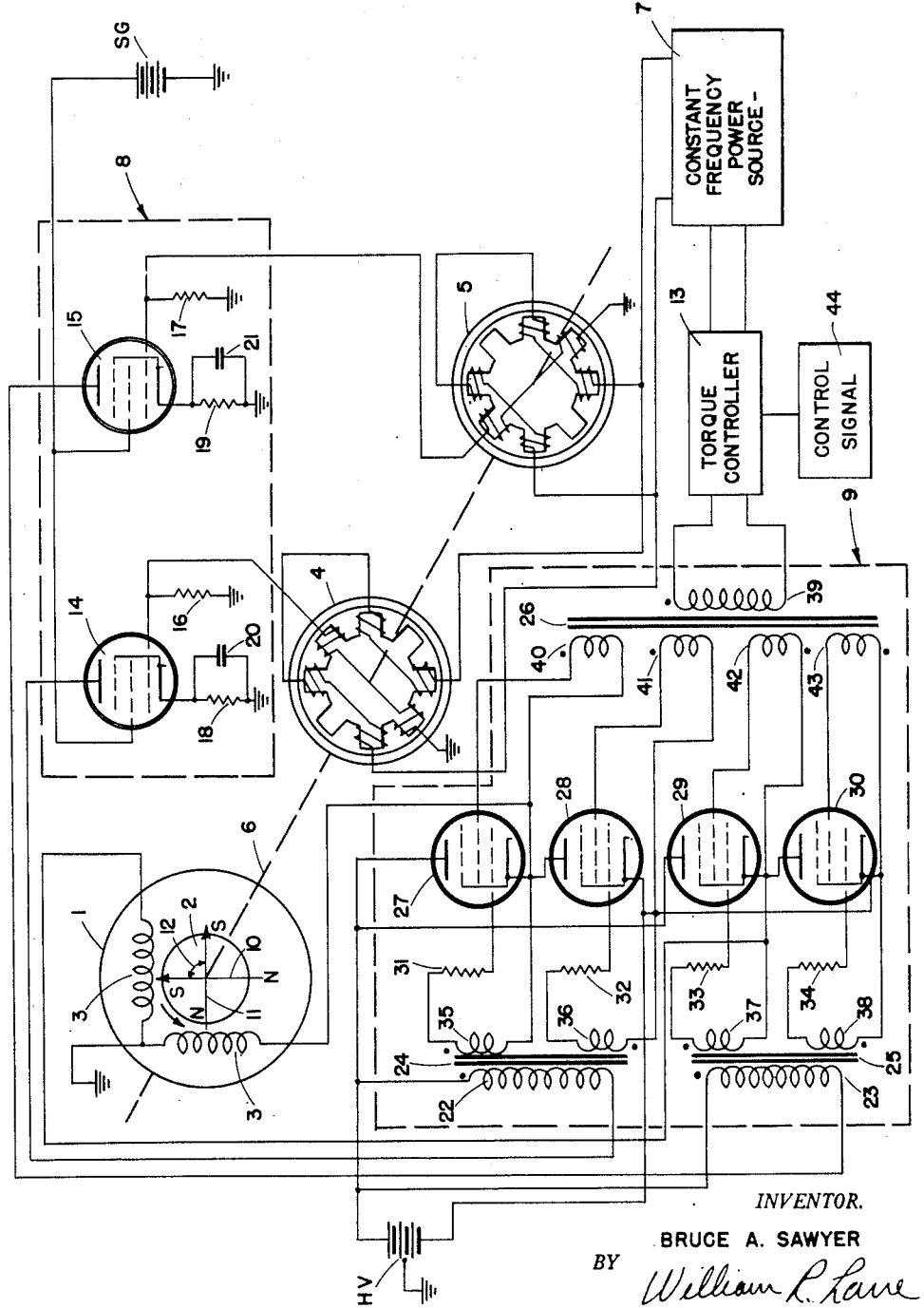

United States Patent Office 2,700,127
Patented Jan. 18, 1955

2,700,127

TORQUE GENERATING SYSTEM

Bruce A. Sawyer, Los Angeles, Calif., assignor to North American Aviation, Inc.

Application October 10, 1952, Serial No. 314,184

6 Claims. (Cl. 318—175)

This invention relates to a torque generating system comprising an alternating current motor in combination with a plurality of resolvers, amplifiers, and demodulators, and in particular to a torque generating system comprising an alternating current motor whose input voltage frequency and phase relationship is servoed to the angular velocity of its output shaft as explained hereinafter.

In many precision instruments wherein a motor is driven in response to a control signal, it is often necessary to minimize spurious torques which result from the brush on a commutator. Thus, a direct current motor is often unsatisfactory for precision instrument applications. It is common practice in the precision instrument art to avoid using brushes and commutators or slip rings by using induction motors. Two-phase induction motors which are commonly used for servo applications customarily have one of their phase windings energized at all times. Thus, when an induction motor is stationary, considerable electrical losses occur. The device of this invention has no electrical losses when its rotor is stationary. Induction motors can be made to have a high starting torque. The running torque of induction motors which have a high starting torque drops rapidly as the speed of the motor increases. The device of this invention maintains a substantially constant torque over a wide speed range. Induction motors have comparatively low efficiency due to copper and eddy current losses in the rotor. The device of this invention has substantially zero eddy current losses, and in the permanent magnet type has zero rotor copper losses. The speed of induction motors is limited by the frequency of the exciting voltage. The device of this invention is not limited by any constant frequency exciting source. Thus, this invention contemplates a torque producing system which is capable of providing full torque under both starting and opertaing conditions together with low energy losses and a wide speed range.

The device of this invention is a torque generating system which has torque and speed characteristics similar to those of a direct current motor whose field current is held constant. The device of this invention is particularly valuable for producing a torque by means of an alternating current motor in response to a servo signal.

Briefly, the device of this invention comprises a synchronous motor, a resolver output for each phase of the motor mechanically attached to the shaft of the motor, an amplifier, and a demodulator for each resolver output. The resolver may be of an electromagnetic type, such as that shown in application Serial No. 205,013, filed January 18, 1951, in the name of Bruce A. Sawyer, for "Electromagnetic Angle Resolver." These resolvers are excited from a generator whose electrical angular frequency is much higher than the mechanical angular frequency of the motor of this invention. The output of the resolver is a modulated sinusoidal function of the shaft rotation. The signal from each resolver is amplified and demodulated. The demodulated signal from each resolver provides the excitation voltage for the stator winding of one phase of the motor. The mechanical angular displacements of the resolvers about the axis of the rotor shaft are adjusted at predetermined angles so that the direction of the magnetic field axis of the rotor differs from the direction of the magnetic field axis of the stator by a predetermined angle, usually an angle which is equal to the particular power angle which provides the maximum torque output for that particular motor.

When a permanent magnet rotor is used in conjunction with resolvers of the type shown in application Serial No. 205,013, the entire device provides an alternating current torque generating device which has no slip rings and is responsive to deviation signals from servo systems.

It is therefore an object of this invention to provide a torque generating system which causes a synchronous motor to operate at a high efficiency and variable speed.

It is another object of this invention to provide an alternating current torque generating device which is fast acting and has torque and speed characteristics which are similar to those of a direct current motor whose field current is held constant, to provide a servo system which maintains an alternating current motor stator field axis at a fixed angle relative to its rotor field axis.

It is another object of this invention to provide a servo controlled alternating current motor whose power angle is maintained fixed.

It is another object of this invention to provide a servo controlled alternating current motor whose input frequency is proportional to the angular velocity of its output shaft.

It is another object of this invention to provide an alternating current motor in combination with appropriate resolvers attached to its shaft to generate signals which are sinusoidal functions of the shaft rotation of said motor, to amplify the signal, and to use it to control the frequency and phase of the electrical energy supplied to said motor.

Other objects of invention will become apparent from the following description taken in connection with the accompanying drawing, in which the single figure is a schematic diagram of a typical two-phase motor embodiment of this invention.

In the figure, rotor 2 of motor 1 is shaft connected to resolver 4 and resolver 5 by means of shaft 6. Resolvers 4 and 5 are electrically connected to alternating power source 7 and amplifier 8. Amplifier 8 is electrically connected to demodulator 9 which in turn is electrically connected to stator windings 3 of motor 1. Arrow 10 indicates the instantaneous position of the stator magnetic field axis due to the current in stator windings 3. Arrow 11 indicates the direction of the rotor magnetic field axis due to the magnet of rotor 2. Arrow 10 and arrow 11 are angularly displaced from each other by an angle which is commonly designated a power angle represented by arrow 12. The magnitude and phase of the signal applied from demodulator 9 to stator windings 3 controls the torque of motor 1 and is controlled in response to control signal 44 by means of torque controller 13 which is connected to demodulator 9 and to power source 7.

Amplifier 8 comprises two vacuum tubes 14 and 15. Resistors 16 and 17 are connected between the grid and ground of each tube 14 and 15, respectively. Cathode bias resistors 18 and 19 are connected in series with the cathode of each tube 14 and 15, respectively. Condensers 20 and 21 shunt resistors 18 and 19, respectively. The control grids of tubes 14 and 15 are connected to the sensing coil on resolvers 4 and 5, respectively. The plates of tubes 14 and 15 connect to the positive terminal of voltage source HV through transformer windings 22 and 23, respectively. The screen grids of tubes 14 and 15 connect to the positive terminal of voltage source SG, while each suppressor grid connects to its respective cathode.

Demodulator 9 comprises three transformers 24, 25, and 26, four vacuum tubes 27, 28, 29, and 30, and four resistors 31, 32, 33, and 34. Transformer 24 has primary winding 22 and secondary windings 35 and 36. Transformer 25 has primary winding 23 and secondary windings 37 and 38. Transformer 26 has primary winding 39 and secondary windings 40, 41, 42, and 43. The suppressor grid of each tube 27, 28, 29, and 30 connects to its respective cathode. The plate of tubes 27 and 29 connect to the positive terminal of voltage source HV. The cathode of tube 27 connects to the plate of tube 28. The cathode of tube 29 connects to the plate of tube 30. Windings 40, 41, 42, and 43 connect between the screen grid and cathode of tubes 27, 28, 29, and 30, respectively. Windings 40, 41, 42, and 43 are phased so that the voltage between the screen grid and cathode of tubes 27 and 28 are opposite in phase to the voltage between the screen grid and cathode of tubes 29 and 30. Winding 39 is connected to power source 7 through torque controller 13, which is merely an amplifier. Resistors 31, 32, 33, and 34 are connected to the control grid of each tube 27, 28, 29, and 30, respectively. Winding 35 is connected between resistor 31 and the cathode of tube 27. Winding 36 is connected in phase opposition to winding 35 between resistor 32 and the cathode of tube 28. Winding 37 is connected between resistor 33 and the cathode of tube 29. Winding 38 is connected in phase opposition to winding 37 between resistor 34 and the cathode of tube 30. The cathodes of tubes 28 and 30 are connected to the negative terminal of voltage source HV which is negative with respect to the ground terminal. Windings 3 of motor 1 are connected to the cathode of tube 27 and ground, and the cathode of tube 29 and ground, respectively. The negative terminal of voltage source SG is connected to ground.

In operation, the desired torque is controlled by torque controller 13. Torque controller 13 controls the amplitude and phase of the voltage supplied to winding 39. When torque controller 13 inverts by 180° the phase of the voltage applied to winding 39, the direction of arrow 10 reverses, and hence the direction of rotation of rotor 2 reverses. Resolvers 4 and 5 are placed upon shaft 6 in such a way as to place the instantaneous field axis of stator 3, represented by arrow 10, at a power angle which is represented by arrow 12 and which creates a maximum torque for a given input voltage. Rotor 2 of motor 1 starts to turn. Because resolvers 4 and 5 are mechanically attached to rotor 2 by means of shaft 6, the signal transferred from resolver 4 is always proportional to the sine of the angle of rotation of rotor 2, while the signal transferred from resolver 5 is always proportional to the cosine of the angle of rotation of rotor 2. Obviously, resolvers 4 and 5 can be combined into one device. The signals from resolvers 4 and 5 are amplified by amplifier 8 and transferred to demodulator 9, and thence to stator 3 of motor 1. Because resolvers 4 and 5 are mechanically connected to rotor 2 and because resolvers 4 and 5 control the frequency of the voltage applied to stator 3, the power angle represented by arrow 12 remains constant at a predetermined angle, for example, in a round rotor two-phase motor, it is 90°. However, arrow 10 can be inverted by 180° by torque controller 13. The magnitude of the power angle remains the same but is in the fourth quadrant instead of the first quadrant of rotor 2 and causes rotor 2 to reverse direction.

The circuit comprising resolver 4, tube 14, resistors 16 and 18, condenser 20, transformer 24, tubes 27 and 28, resistors 31 and 32, and windings 40 and 41 is identical in structure and operation to the circuit comprising resolver 5, tube 15, resistors 17 and 19, condenser 21, transformer 25, tubes 29 and 30, resistors 33 and 34, and windings 42 and 43.

Resolver 4 generates a signal equal to $E \sin \theta \sin \omega$ wherein $E$ is the amplitude of the signal, $\theta$ is the angle of rotation of shaft 6, and $\omega$ is the angular frequency of power source 7. The signal is amplified by tube 14. Resistors 16 and 18, and condenser 20 create the proper biasing potentials upon tube 14. The signal is transferred through transformer 24 to the control grids of tubes 27 and 28. The voltage applied to the control grid of tube 27 is in phase opposition to the voltage applied to the control grid of tube 28. Resistors 31 and 32 prevent excessive grid current from flowing in the control grids of tubes 27 and 28, respectively, whenever the applied voltage from windings 35 or 36 goes positive.

Reference voltage of the same frequency as that of power source 7 is applied in phase to the screen grids of tubes 27 and 28. The high frequency component of the control grid voltage of each tube 27 and 28 is either in phase or opposite in phase with the screen grid voltage. When the control grid and screen grid voltages are opposite in phase, the tube does not conduct. When the control grid and screen grid voltages are in phase, the tube conducts over the positive half of each cycle of the voltage of power source 7. Thus, at any one time only one tube of the pair of tubes 27 and 28 can conduct. When shaft 6 and resolver 4 have turned through a half revolution, the phase of the high frequency component of voltage from resolver 4 reverses. When the phase of the voltage applied to the grids of tubes 27 and 28 reverses, the tube which was conducting ceases to conduct, and the tube which was not conducting starts to conduct thereby reversing the direction of current flow through the appropriate winding 3. Reversal by 180° of the phase of the voltage applied to the screen grids of tubes 27, 28, 29, and 30 causes the current in windings 3 to reverse direction and hence the direction of rotation of rotor 2 to reverse.

A list of typical values for the electrical components shown in Fig. 1 follows:

| Element No.: | Value |
| --- | --- |
| 14, 15 | 6AV6. |
| 16, 17 | 100,000 ohms. |
| 18, 19 | 1,000 ohms. |
| 20, 21 | 25 microfarads. |
| 27, 28, 29, 30 | 6AQ5. |
| 31, 32, 33, 34 | 100,000 ohms. |

Thus, a torque generating system has been provided which has torque and efficiency characteristics that are similar to those of a direct current motor whose field current is held constant. This system is efficient and provides a torque by alternating current means which is substantially constant over a wide range of rotational speeds, and has zero power consumption when it is stationary.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, alternating current motor means, alternating voltage generating means attached to the shaft of said motor means, the voltage of said voltage generating means having a predetermined and preadjusted phase angle, the phase of the currents fed to the input of said motor means being responsive to the phase angle of the voltage from said voltage generating means, and an external energy source for supplying energy losses in said motor means whereby an alternating current torque generating system is provided which causes said motor to operate at maximum torque at all speeds of said motor.

2. In combination, an alternating current motor with a plurality of resolvers attached to its shaft for indicating the rotation of said shaft, servo amplifier means connected between the output of said resolvers and the input of said motor, and the phase of the voltage output of said resolvers being preadjusted whereby the currents in the alternating current windings of said motor cause the torque angle of said motor to remain constant with variable speeds of rotation of the rotor of said motor.

3. An alternating current torque generator comprising an alternating current polyphase synchronous motor, means for generating a voltage which has a sinusoidal relation to the angular rotation of the shaft of said motor, amplifier means connected between said voltage generating means and the alternating current windings of said motor, the phase of the voltage output from said voltage generating means being preadjusted whereby the currents in said alternating current windings of said motor are properly phased to cause the stator field of said motor to be displaced from the rotor field of said motor by a predetermined angle.

4. An alternating current torque generator comprising an alternating current polyphase synchronous motor; a resolver, an amplifier, and a demodulator combination for each phase of said motor; each said combination having one said resolver whose output is electrically connected to the input of one said amplifier whose output is connected to the input of one said demodulator; each phase winding of said motor having the phase of the current therein controlled by the output of one said demodulator in response to the signal from the said resolver associated with that particular demodulator; said resolvers positioned upon the shaft of said motor in a predetermined angular position whereby the current in said phase windings is of the proper phase to cause the stator field axis of said motor to be displaced from the rotor field axis of said motor by a predetermined angle.

5. A torque generating system comprising a polyphase synchronous motor having a stator winding for each phase, a magnetic rotor and a shaft connected to said rotor, a plurality of resolvers mechanically connected to and turned by said shaft, each said resolver corresponding to a separate phase of said motor, a constant frequency power source electrically connected to said resolvers for applying exciting voltage thereto, a plurality of amplifiers equal in number to said resolvers and being connected respectively to the output terminals thereof, a plurality of demodulators of equal number to said amplifiers, the input terminals of each said demodulators being connected respectively to the output terminals of each said amplifier, and the output terminals of each said demodulator being connected respectively to each said stator winding of said motor, said constant frequency power source being connected to said demodulators for supplying energy to said motor, said resolvers being angularly adjusted about the axis of said shaft, and said demodulators being connected to said phase windings with a polarity to cause the particular angle between the field of said magnetic rotor and the field of said stator windings to be maintained at a constant predetermined angle.

6. A torque generating system comprising a two-phase motor having two stator windings, one for each phase, a magnetic rotor, and a shaft connected to said rotor; two resolvers mechanically connected to and turned by said shaft, a constant frequency power source electrically connected to said resolvers for applying exciting voltage thereto, two amplifiers whose input terminals are connected respectively to the output terminals of said resolvers, two demodulators whose input terminals are connected respectively to the output terminals of said amplifiers, and the output terminals of said demodulators being connected respectively to the said stator windings, said constant frequency power source being connected to said demodulators, said resolvers being angularly adjusted about the axis of said shaft, and said demodulators being connected to said stator windings with a polarity to cause the particular angle between the field of said magnetic rotor and the field of said stator windings to be maintained at a constant predetermined angle.

References Cited in the file of this patent

UNITED STATES PATENTS

| | | |
|---|---|---|
| 2,411,871 | De Westfelt | Dec. 3, 1946 |
| 2,497,216 | Greenough | Feb. 14, 1950 |
| 2,507,936 | Schroeder | May 16, 1950 |
| 2,567,202 | Goertz | Sept. 11, 1951 |